US008004237B2

(12) United States Patent
Manor et al.

(10) Patent No.: US 8,004,237 B2
(45) Date of Patent: Aug. 23, 2011

(54) BATTERY POWER SUPPLY WITH BIDIRECTIONAL BATTERY CHARGE CONTROLLER

(75) Inventors: Dror Manor, Herzlia (IL); Guy Weinstein, Neve Monosson (IL)

(73) Assignee: Techtium, Ltd., Tel Aviv (IL)

( * ) Notice: Subject to any disclaimer, the term of this patent is extended or adjusted under 35 U.S.C. 154(b) by 529 days.

(21) Appl. No.: 11/908,303

(22) PCT Filed: Mar. 10, 2006

(86) PCT No.: PCT/IL2006/000317
§ 371 (c)(1),
(2), (4) Date: Mar. 31, 2008

(87) PCT Pub. No.: WO2006/095352
PCT Pub. Date: Sep. 14, 2006

(65) Prior Publication Data
US 2008/0197801 A1   Aug. 21, 2008

Related U.S. Application Data

(60) Provisional application No. 60/660,353, filed on Mar. 11, 2005.

(51) Int. Cl.
*H02J 7/00* (2006.01)
*H02J 1/12* (2006.01)
(52) U.S. Cl. ........ 320/114; 320/107; 320/112; 320/132; 320/136; 320/103; 320/106; 307/45; 307/46
(58) Field of Classification Search .................. 320/103, 320/114
See application file for complete search history.

(56) References Cited

U.S. PATENT DOCUMENTS

| 5,352,966 | A | 10/1994 | Irons et al. |
| 5,717,308 | A * | 2/1998 | Nishitani et al. ............... 396/279 |
| 6,043,626 | A | 3/2000 | Snyder et al. |
| 6,127,801 | A | 10/2000 | Manor |
| 6,181,100 | B1 * | 1/2001 | Shoji ............................. 320/103 |

(Continued)

FOREIGN PATENT DOCUMENTS
WO   2006/095353 A2   9/2006
(Continued)

OTHER PUBLICATIONS

PCT Int'l Search Report, mailed Apr. 3, 2007 in PCT/IL06/00317 (WO 2006/095352).

(Continued)

*Primary Examiner* — Edward Tso
*Assistant Examiner* — Ahmed Omar
(74) *Attorney, Agent, or Firm* — Daniel Feigelson

(57) ABSTRACT

A bidirectional battery charge control system for a portable electronic device which uses a rechargeable main battery. The system enables the connection of an auxiliary battery to the device for inputting additional current to the device. Control of the current flow into and out of the auxiliary battery is performed by a bidirectional charger. The auxiliary battery can contain one or more readily available primary or secondary cells, and the bidirectional charger is such that an external charger connected to the device, generally used to charge the main rechargeable battery of the device, can also recharge a secondary cell or cells in the auxiliary battery, if such are installed. The use of such an auxiliary battery enables the main battery to be hard-wired into the device.

24 Claims, 6 Drawing Sheets

U.S. PATENT DOCUMENTS

| | | | |
|---|---|---|---|
| 6,304,061 B1 * | 10/2001 | Toya | 320/134 |
| 6,479,963 B1 | 11/2002 | Manor et al. | |
| 6,667,599 B2 | 12/2003 | Stone | |
| 6,709,784 B2 | 3/2004 | Resch | |
| 6,768,290 B1 | 7/2004 | Smith | |
| 7,402,981 B2 * | 7/2008 | May et al. | 320/137 |
| 7,482,091 B2 * | 1/2009 | Bourilkov et al. | 429/121 |
| 2002/0039016 A1 * | 4/2002 | You et al. | 320/115 |
| 2004/0217739 A1 | 11/2004 | Cummings | |
| 2005/0017674 A1 * | 1/2005 | Sato | 320/106 |
| 2005/0031944 A1 * | 2/2005 | Sodemann et al. | 429/150 |
| 2005/0248312 A1 * | 11/2005 | Cao et al. | 320/114 |
| 2006/0192531 A1 * | 8/2006 | Nishida | 320/128 |

FOREIGN PATENT DOCUMENTS

| | | |
|---|---|---|
| WO | 2006/095352 A3 | 6/2007 |

OTHER PUBLICATIONS

Written Opinion of the ISA, mailed Apr. 3, 2007 in PCT/IL06/00317 (WO 2006/095352).

PCT Int'l Search Report, mailed Jun. 20, 2007 in PCT/IL06/00318 (WO 2006/095353).

Written Opinion of the ISA, mailed Jun. 20, 2007 in PCT/IL06/00318 (WO 2006/095353).

\* cited by examiner

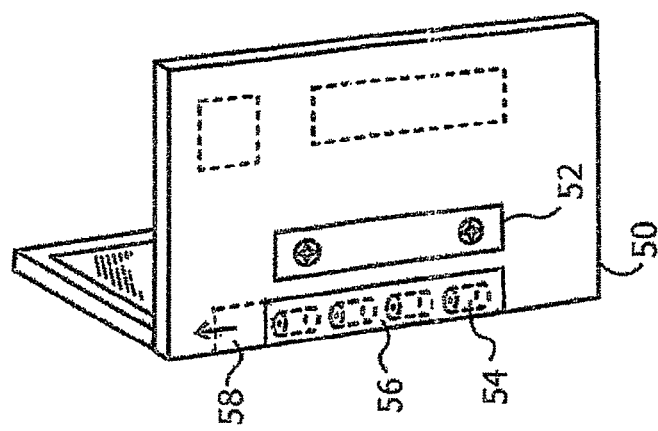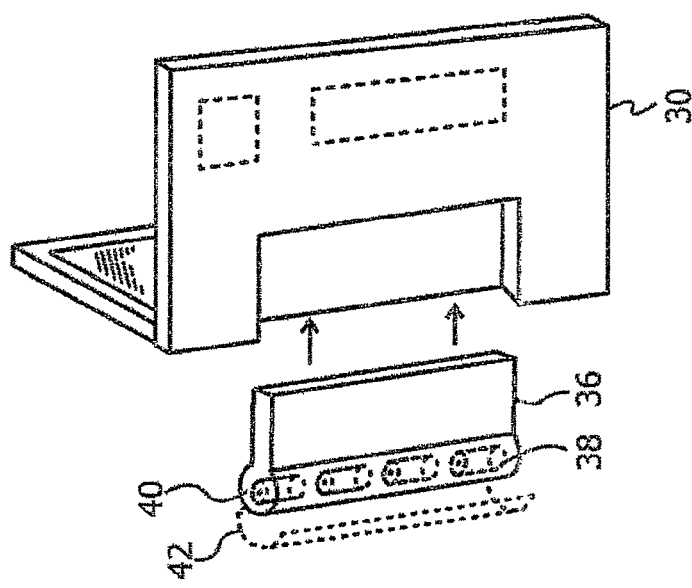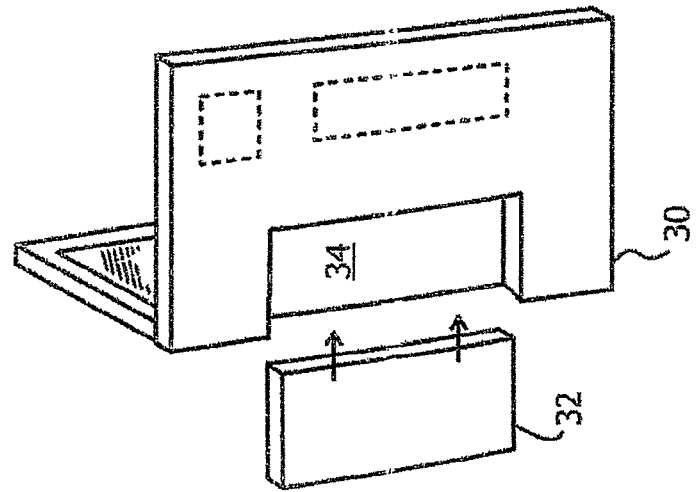

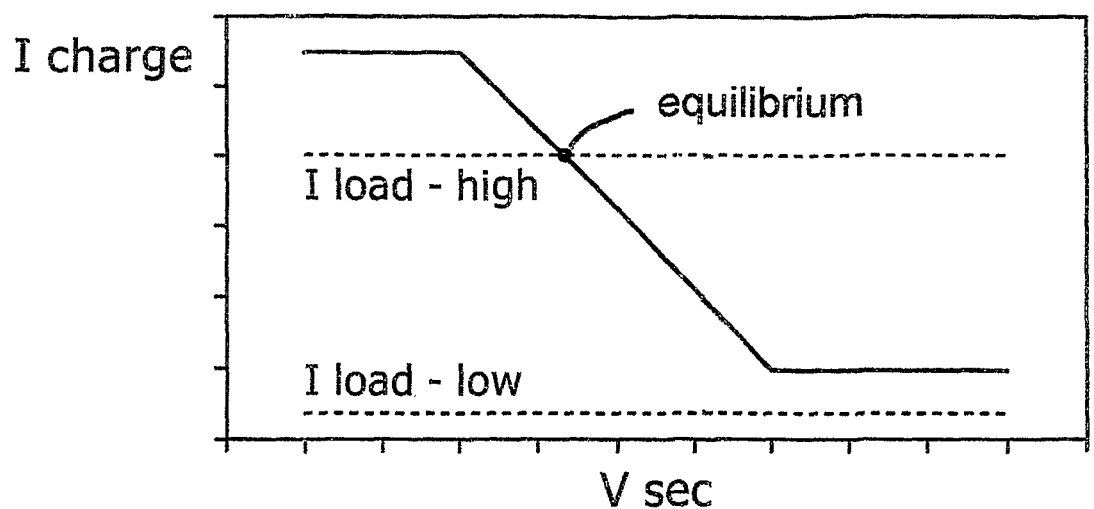
Fig. 5
Fig. 6
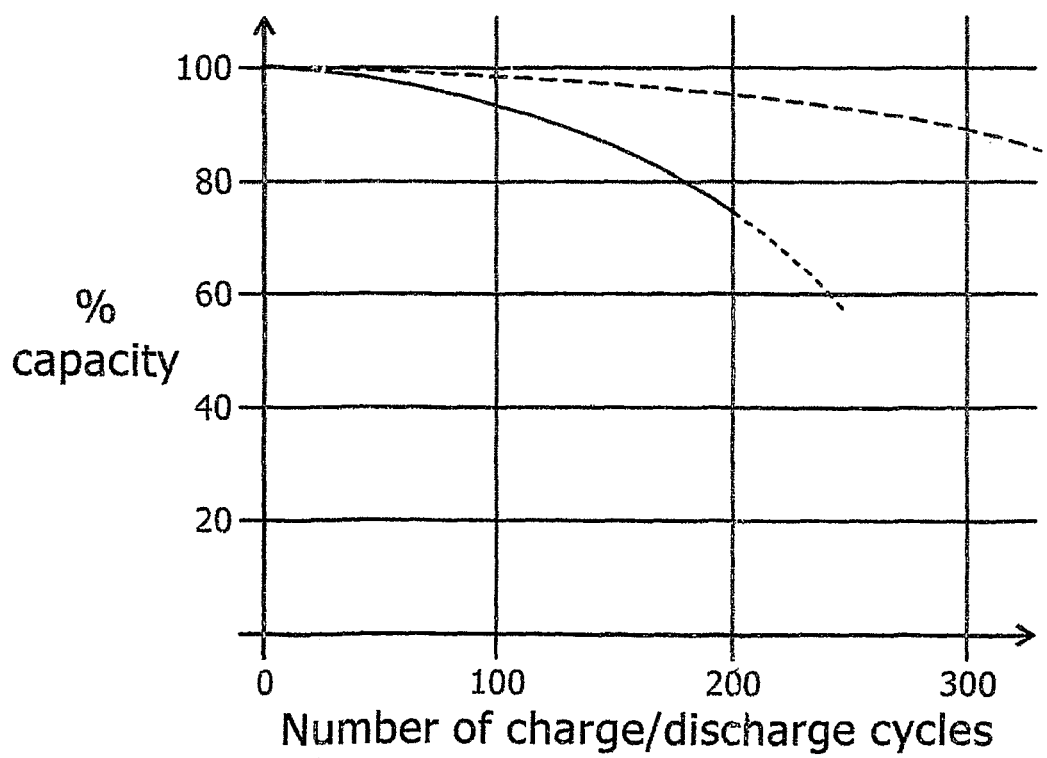

BATTERY POWER SUPPLY WITH BIDIRECTIONAL BATTERY CHARGE CONTROLLER

FIELD OF THE INVENTION

The present invention relates to the field of battery equipped power supply systems for use in handheld electronic devices, and especially controllers for the bidirectional regulation of the charging and discharging of auxiliary batteries

BACKGROUND OF THE INVENTION

The proliferation of portable battery powered devices, such as cellular telephones, video cameras, portable laptop computers, and the like, has increased dramatically in the last several years and this trend is expected to continue. These devices typically use a rechargeable battery that is built into the device to provide the needed power. The length of time that the battery powers the device is dependent primarily upon the size of the battery and the number of energy consuming features built into the device. For instance, in response to consumer demand, cell phone manufacturers often incorporate into the phones features such as the ability to send and receive digital pictures and/or text messages, and even real-time video transmissions. Unfortunately, the inclusion of these features usually places additional demands on the rechargeable batteries that power the cell phones. The net result is that cell phone run times are becoming shorter due to the increased power demands. At the same time that the electrical demand placed on the battery is increasing, the size and weight of cell phones is decreasing. As the size of the cell phone is reduced, the size of the battery compartment built into the cell phone is also generally reduced. The combination of these two trends, i.e. increased electrical demand and reduced battery size, often causes cell phone users to experience a lost telephone call or data transmission due to the depletion of the phone battery at an inopportune moment. An additional trend that complicates resolution of this problem is that most cell phones require a battery that has specific size and shape characteristics. In order to encourage consumers to purchase replacement batteries from the cell phone manufacturer, the cell phones are made with batteries that have unique shapes, locking mechanisms, voltage requirements, etc. Furthermore, the recharging port built into the cell phones limit the type of charger that can be connected to the cell phone. Collectively, these factors limit the consumer's ability to readily replace the depleted battery with another power source.

Numerous attempts have been made to develop a versatile auxiliary portable power supply for cellular telephones. For example, U.S. Pat. No. 6,127,801 to D. Manor, for "Battery Pack Assembly", discloses a power supply that includes a battery pack and a base unit which has bidirectional circuitry. In U.S. Pat. No. 6,479,963 to D. Manor and G. Weinstein, for "Rechargeable Battery Packs", there is described a rechargeable battery pack for use with cellular telephones or other portable devices, including a conventional rechargeable battery for powering the device, and a user-replaceable primary cell for recharging the rechargeable cell when desired by the user, thus acting as a built-in charger for the device. This battery pack uses as its additional energy source a replaceable primary cell or battery, which when depleted, needs to be replaced by a fresh battery. In another example, U.S. Pat. No. 6,709,784 to O. Resch, for "Back-up Battery for a Cellular Telephone" there is disclosed a battery pack that can be plugged into a cellular phone's contact to recharge the phone's built-in rechargeable battery and/or to directly power the cell phone. This invention does not provide any voltage converting circuitry to match the battery pack output voltage to that required for charging the phone's rechargeable battery, and relies on the internal charge control circuits of the phone to ensure correct voltage compatibility. Furthermore, the battery is preferably packaged with the plug that allows the battery pack to be connected to the phone. Consequently, when the battery is depleted, the entire battery pack, including the plug, must be discarded, increasing consumer costs.

Therefore, there exists a need for an auxiliary direct current power source that uses a commonly available battery that the consumer can readily insert into and remove from a reusable housing, and that can be either a readily available primary cell or battery, or a secondary cell or battery with the added option of recharging the secondary cell or battery inside the device's housing, using the device's usual charging method. The power supply needs to be lightweight, volume-efficient and easily adaptable to a wide array of cell phones that utilize batteries of various shapes and sizes.

Additionally, rechargeable batteries built into portable electronic devices are generally expensive and not widely available. Replacement of such originally equipped batteries with lower cost or more readily available types of batteries generally results in degradation of the available power for the device, or of the use-time of the device, since the built-in batteries supplied by the device manufacturer have usually been selected for optimum performance and operating time. This is particularly true of lap-top and other portable computers, where the critical nature of the tasks performed generally negates compromise in built-in battery selection and use. Therefore, there have been few previous attempts at providing cheaper or more versatile battery power solutions for such portable electronic devices.

There therefore also exists a need for providing auxiliary battery packs to provide additional power to augment the internal rechargeable battery of the device, thereby providing additional power from sources less costly and more readily available than the generally expensive rechargeable batteries built into the device, yet without compromising performance of the device.

The disclosures of each of the publications mentioned in this section and in other sections of the specification, are hereby incorporated by reference, each in its entirety.

BRIEF SUMMARY OF THE INVENTION

The present invention seeks to provide, according to a first preferred embodiment of the present invention, a new bidirectional battery charge control system for portable electronic devices which use a rechargeable main battery. The system enables the connection of an auxiliary or additional battery or cell to the device for inputting additional current to the device. This combination of main and auxiliary batteries is known as a hybrid battery. Control of the current flow into and out of the auxiliary battery or cell is performed by a bidirectional charge controller. The auxiliary battery can contain one or more primary or secondary cells, and the bidirectional charge controller is such that an external charger, such as a mains wall plug charger, connected to the device and generally used to charge the main rechargeable battery of the device, can also recharge the secondary cell(s) in the auxiliary battery, on condition that the auxiliary battery is a secondary battery.

According to another preferred embodiment of the present invention, the bidirectional charge controller also acts as a voltage converter, to convert the auxiliary battery voltage to the voltage generally required for powering the device, and for charging the device's main rechargeable battery. The main battery voltage is usually, though not always, higher than the auxiliary battery voltage. The ability of the auxiliary battery to charge the device's main battery is particularly useful since readily available primary cells can be used as the auxiliary battery, in situations where the main battery is depleted without any access to mains power supply for conventional recharging. Furthermore, the bidirectional charge controller is preferably microprocessor controlled, and is programmed to be able to detect the battery chemistry of the auxiliary battery, and to disable charging current flow into the auxiliary battery if primary cell chemistry is detected. Likewise, in the reverse direction, the microprocessor algorithm is preferably able to regulate the charging current from the auxiliary battery to the device main rechargeable battery such that optimal energy transfer is obtained for every stage of the main battery's state of charge.

Additionally, the bidirectional charge controller preferably includes intelligent control characteristics, which ensure that the current drawn from the auxiliary battery, especially when it is a primary battery, is matched to the device load requirements, to the level of depletion of the main battery, and to the most efficient manner of using the charge capacity of the auxiliary battery. These charge characteristics are varied in real time according to sensing performed of the load current, and the output terminal voltages of the main battery and the auxiliary battery at any given time.

In cases where the auxiliary battery is rechargeable, the bidirectional charge controller enables the auxiliary battery and main device rechargeable battery to operate essentially transparently in relation to each other, such that they can be considered to behave as one large rechargeable battery. The auxiliary battery in this case thus effectively adds capacity to the main rechargeable battery. This enables the auxiliary battery pack to be considered as the only replaceable part of the total battery capacity of the device, and also enables the main battery to be permanently wired into the device, if desired, thus saving the costs and the potentially reduced reliability of battery contacts. Furthermore, when a rechargeable auxiliary battery is used, the device's power management system can be arranged to use the capacity of this battery first, and only if it is depleted, to use the main battery of the device. The life of the main rechargeable battery is thus lengthened, since there is less total use of it. According to this arrangement, the device may advantageously be constructed such that the only battery in the device which is meant to be readily user-replaceable is the auxiliary battery, which can then preferably be housed in its own compartment, separately from the main battery which the user need generally not be concerned with.

According to further preferred embodiments of the present invention, the auxiliary battery can be installed and used externally to the portable device, in a separate housing, connected to the portable device preferably by means of a flexible lead, and plugged thereby into the external charging input of the portable device. In such embodiments, the bidirectional charge controller is preferably built into the housing containing the auxiliary battery, usually on a printed circuit board, and enables the auxiliary battery either to supply current to the device like an external charger, or, if it is a secondary battery, allows the auxiliary battery to be charged by connection to an externally powered charger. The auxiliary battery can thus be considered to behave as a compact portable external charger for the device, for use, for instance, in situations when the main battery of the device is depleted without access to a mains recharging source of power.

There is thus provided in accordance with a preferred embodiment of the present invention, a battery power supply system for powering an electronic device, comprising:
(i) a main rechargeable battery,
(ii) an additional battery comprising one of at least one primary cell and at least one rechargeable cell, and
(iii) a bidirectional charge controller controlling current flow between the additional battery and the rechargeable battery.

In the above described system, the bidirectional charge controller controls current flow either from the additional battery to the rechargeable battery, or from the rechargeable battery to the additional battery.

There is further provided in accordance with yet another preferred embodiment of the present invention a battery power supply system as described above, and wherein the additional battery has a first nominal terminal voltage, and the rechargeable battery has a second nominal terminal voltage, and the bidirectional charge controller converts current output from the additional battery at the first nominal terminal voltage to a second voltage for powering the device. Alternatively and preferably, in such an embodiment, the bidirectional charge controller may convert current output from the additional battery at the first nominal terminal voltage to a second voltage for charging the rechargeable battery. In either of these cases, the first nominal terminal voltage may preferably be lower than the second nominal terminal voltage, or the first nominal terminal voltage may preferably be higher than the second nominal terminal voltage.

There is further provided in accordance with still another preferred embodiment of the present invention, any of the above described battery power supply systems, which determine the battery chemistry of cells in the additional battery, and enable current flow into the additional battery only if the additional battery comprises at least one rechargeable cell.

In accordance with further preferred embodiments of the present invention, in the above described battery power supply systems, the additional battery may comprise at least one primary cell, and the bidirectional charge controller then preferably regulates current supplied from the additional battery to charge the rechargeable battery at a rate depending on its state of charge.

Alternatively and preferably, the additional battery of the battery power supply system may comprise at least one primary cell, and the power supply system then preferably initiates the drawing of current from the additional battery only when the main battery is depleted down to a preplanned criterion. This preplanned criterion may preferably be that the main battery is at least 90% depleted.

In any of the above-described battery power supply systems, the at least one rechargeable cell in the additional battery may be either one of a NiMH and a NiCd cell. Additionally, the at least one primary cell in the additional battery may preferably be an alkaline cell or a fuel cell.

There is also provided in accordance with yet a further preferred embodiment of the present invention, a battery power supply system according to any of the previously described embodiments, and wherein the rechargeable battery is installed socketlessly into the device. According to this embodiment, only the additional battery is then preferably readily accessible for replacement by a user.

There is even further provided in accordance with a preferred embodiment of the present invention, a battery power supply system as described hereinabove, and wherein the additional battery comprises at least one rechargeable cell, and the bidirectional charge controller preferentially draws current from the additional battery before drawing current from the rechargeable battery. In such an embodiment, the preferential drawing of current from the additional battery before the rechargeable battery is then operative to lengthen the lifetime of the rechargeable battery. Furthermore, the main rechargeable battery is then preferably used only after the additional battery is substantially depleted, such that the life of the main rechargeable battery is lengthened.

In any of the previously described embodiments, the rechargeable battery may preferably be a Li-ion battery, and the portable electronic device may preferably be a cellular telephone, a video camera or a laptop computer.

In any of the previously described embodiments, the additional battery is preferably installed within the device. However, in accordance with yet another preferred embodiment of the present invention, there is provided a battery power supply system according to any of the previously described embodiments, and wherein the additional battery and the bidirectional charge controller are installed in a housing external to the device. This housing preferably comprises a single connector which both outputs current from the additional battery to the portable device, and which inputs charge current for the additional battery from an external charger.

BRIEF DESCRIPTION OF THE DRAWINGS

The present invention will be understood and appreciated more fully from the following detailed description, taken in conjunction with the drawings in which:

FIGS. 4A to 4C are schematic illustrations of the underside of a laptop computer, showing different methods of incorporating a hybrid battery system, constructed and operable according to another preferred embodiment of the present invention; FIG. 4A shows the incorporation of a prior art standard battery, and FIGS. 4B and 4C show different preferred methods of incorporating a hybrid battery of the present invention;

FIG. 5 is a graph illustrating the current-voltage control characteristics of the charge control algorithm, according to a further preferred embodiment of the present invention.

FIG. 6 is a graph illustrating the increased cycle lifetime obtained from the main rechargeable battery of a notebook computer powered using a 30 Wh capacity hybrid battery according to the present invention, as compared with the cycle lifetime of a 30 Wh non-hybrid rechargeable battery;

DETAILED DESCRIPTION OF THE INVENTION

The bidirectional battery system of the present invention is directed at providing an auxiliary battery for portable electronic devices, such as cellular telephones, video cameras, laptop computers, and the like, which provides readily available and versatile power to augment the main rechargeable battery in the device, and which can include different types of cells for use in a back-up power function.

Figure 1:
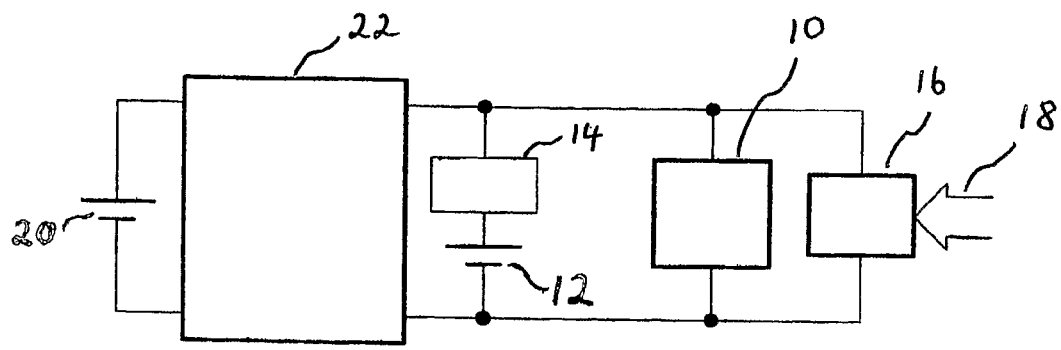
FIG. 1 is a schematic block circuit diagram of the overall arrangement of a bidirectional battery system constructed and operative according to a preferred embodiment of the present invention.

Reference is now made to FIG. 1 which illustrates the overall arrangement of a bidirectional battery system constructed and operative according to a preferred embodiment of the present invention. The operating circuitry of the portable device 10 is powered in the usual manner by its own built-in rechargeable battery 12, which can preferably be a Li-ion type of battery. An internal protection circuit 14 protects the built-in rechargeable battery against harmful conditions, including overcharge, over-discharge and excessive temperature. In addition, an auxiliary or additional battery 20 is provided, which can be incorporated into the device, with easy access for changing the battery when and if necessary. It should be noted that the terms battery and cell, though formally distinct, a battery technically being an assembly of more than one cell, are sometimes used in this application interchangeably in relation to the auxiliary battery, since the auxiliary "battery" may either contain a single cell, or comprise several cells. However, the invention is understood to be applicable regardless of whether a cell or a battery is used as the auxiliary "battery", and the meaning is understood to be sometimes interchanged, as in the widespread popular use of the term battery, when in fact only a single cell is intended.

The auxiliary battery 20 preferably contains a replaceable, readily available standard-sized cell or cells for inputting auxiliary power to the power system of the device. However, this auxiliary battery differs in two major aspects from those described in the prior art mentioned in the Background Section.

(i) Firstly, the auxiliary battery can comprise either a primary cell or cells, or a rechargeable cell or cells.
(ii) Secondly, the auxiliary battery 20 is connected to the device through a bidirectional charger 22, which monitors and controls the flow of current both out of the battery to the power system of the device, and also from the power system of the device into the battery. In addition, the bidirectional charger 22 acts as a voltage converter to convert the generally comparatively low battery voltage to the higher voltage required by the power system of the device, and conversely to convert the comparatively higher charging voltage present in the device when, for instance, connected to an external wall plug adapter 18, to a lower voltage for charging the auxiliary battery. If the auxiliary battery has a higher terminal voltage than that of the device's main battery, the converter operates accordingly. In general, a charging controller 16 is included, either as part of the device circuitry, or within the wall adapter 18, in order to control the rate of charging from the external wall adapter.

This second aspect, (ii), provides the bi-directional charger with a double functional ability. In addition to charging the main rechargeable battery using energy from the auxiliary battery, the charger can also recharge the auxiliary battery through the internal charging circuits of the device. This means that the energy transferred through the bidirectional charger 22 can flow in two directions—hence the term "bidirectional charger". These two different flow directions are illustrated in the block circuit diagrams of FIGS. 2 and 3, in which the current flow directions are indicated by arrows, as follows:

(a) Current flow from the auxiliary battery 20 to the main rechargeable battery 12 of the device, thereby giving an energy boost to the rechargeable battery when needed. This situation is schematically illustrated in the block circuit diagram shown in FIG. 2.

(b) Current flow from the device's AC wall adapter charger 18, 16 connected to the device 10 and thereby to its rechargeable battery 12, through the bidirectional charger 22, to the auxiliary battery 20. This option is useful because of the feature of the present invention whereby the auxiliary battery is a rechargeable battery. This situation is illustrated in the block circuit diagram shown in FIG. 3.

The bidirectional charger must be able to accommodate and accordingly control both of these two possible operational applications of the auxiliary battery. In order to fulfill both of these functions efficiently, the bidirectional charger 22 is preferably microprocessor-based. It provides a current interface between the single-cell or multiple-cell auxiliary battery 20, which preferably contains either a secondary cell such as a Nickel Metal Hydride (NiMH) or a Nickel Cadmium (NiCd) or a primary battery or cell, such as an alkaline battery or a fuel cell, and the single-cell or multiple-cell main battery of the device, which preferably contains a Li-ion battery. The auxiliary battery side is conveniently called the "low voltage side", and the main rechargeable battery of the device is conveniently called the "high voltage side", since the nominal operating voltage of the main battery is generally higher than that of the auxiliary battery. The bidirectional charger is able to transfer current and to control battery charging, either from low-voltage to high-voltage side when current is drawn from the auxiliary battery 20, or from high-voltage to low-voltage side when an external wall plug charger 18 is connected to the high voltage side.

The bidirectional charger also enables optimal and automatic charge control of the NiMH, NiCd, and Li-Ion battery chemistries, depending on which current flow direction is required. On the low-voltage side, it automatically detects the auxiliary battery chemistry, and prevents charging if the auxiliary battery contains a primary cell or cells. Conversely, when charging from an auxiliary battery to a Li-Ion main battery, the bidirectional charger regulates the charge current in real time to achieve the optimal energy transfer as a function of the Li-Ion battery voltage. Since primary batteries generally have a high internal resistance, their efficiency drops as discharge current rises. Therefore, when a primary battery is used in the auxiliary battery, the charge current from the auxiliary to Li-Ion battery is reduced when the Li-Ion is relatively full to increase efficiency, and is increased when the Li-Ion is relatively empty, to make sure that the device can be operated immediately. In this way, if the Li-Ion battery is almost or fully depleted, immediate use of the device, using only auxiliary battery energy, is possible. Under normal circumstances high-consumption devices cannot be operated well from primary batteries, because of their low efficiency at high discharge rates. Special charge current algorithms enable the achievement of a balance between the enablement of immediate use of the device, even with a depleted or almost depleted Li-Ion battery, and the maintenance of good efficiency over time. Also, since the auxiliary battery powers the device through the main battery, it allows the main battery, which has low internal resistance, to deliver any short, high current peaks needed by a device such as a cellular phone. If a cell phone were powered using only primary batteries or fuel cells, its functionality would generally be significantly curtailed, because the comparatively high internal resistance of primary batteries or fuel cells would prevent them from handling the high current peaks sometimes drawn by the phone. According to the present invention, even if the main battery is virtually completely depleted, the device is still functional since the main battery can still provide the high currents required for transmission, since these currents are very short duration peak currents which thus take very little integrated energy from the main battery, while the auxiliary battery provides the low level continuous current for operating the device. Additionally, when charging from a NiMH or NiCd auxiliary battery to the Li-Ion main battery, a device powered by the Li-Ion sees the entire two-chemistry battery as a single battery source. The system of the present invention also preferably incorporates battery temperature sensors, both in the auxiliary battery, and in the main battery, and the bidirectional charger adjusts the charging current, in whatever direction it is currently working, in accordance with the measured battery temperatures.

Since the bidirectional charger is microcontroller-based, its implementation is flexible, and it preferably includes several I/O interface lines, programmable according to special needs or requirements of particular applications.

Some of the above-mentioned operational features of the bidirectional charger are preferably provided by means of a sensing circuit and a voltage conversion circuit built into the bidirectional charger.

The auxiliary battery, as previously mentioned, can contain either a rechargeable cell or cells, such as a NiMH or a NiCd battery, or a primary cell or cells, such as an alkaline battery or a fuel cell. For each situation, the system behaves differently.

If the auxiliary battery is rechargeable, the auxiliary battery and main device rechargeable battery can be considered to behave as one large rechargeable battery, such that the auxiliary battery effectively adds capacity to the main rechargeable battery. The space used for the auxiliary battery can thus be considered to be efficiently used, as it is effectively an addition to the device's own rechargeable battery. In this situation, according to another preferred embodiment of the present invention, since the auxiliary battery is readily removable, and effectively contributes a part of the total rechargeable battery capacity of the device, the main rechargeable battery can be permanently wired into the device so that it is no longer removable, since there is no need to have two replaceable sets of rechargeable batteries. There are a number of advantages to use of such a permanently built-in main battery, as follows:

(i) The performance of the main rechargeable battery increases, since not only is there reduced contact resistance because the battery is hard-wired into the device, but there is also a possibility of increasing the battery's capacity, since space is saved by integrating the battery permanently into the device, obviating the need for the detachable components and contacts for the battery.

(ii) There is better reliability and safety, since it is no longer possible for users to install non-original batteries as the main power source, since the main rechargeable battery is built in.

(iii) There are lower production costs, since (a) there is no need for the internal battery pack design, for the internal battery pack material and manufacturing costs, and for the gold battery pack contacts, (b) assembly is simpler since the main rechargeable battery can be assembled in the same process as the entire device, instead of in a separate process, and (c) product integration is easier, obviating the need for special considerations in fitting the internal battery pack to the available space in the device.

The above advantages of use of a permanently built-in main battery are also applicable when the auxiliary battery is a primary battery, though such an embodiment is generally commercially less useful.

It should be understood that the term permanently built-in main battery is not meant to be taken literally, since the main rechargeable battery will still be replaceable by means of unsoldering and resoldering the battery into circuit, as with any other non-socketed component.

If the auxiliary battery is a primary battery or cell, it can operate as an auxiliary energy boost for the device's main rechargeable battery, capable of providing a refill charge to the main battery completely independent of any electrical outlet or other such source, and taking advantage of the widespread availability and low price of such primary batteries.

There are a number of operational advantages to the use of the auxiliary battery of the present invention:

(i) Such an auxiliary battery supplies an optional backup energy or energy boost to a fading main battery.

(ii) If the auxiliary battery is rechargeable, such that both batteries can be considered to operate as one large rechargeable battery, the option is thereby provided of effectively replacing some of the cells of the "large" battery, namely the cells of the auxiliary battery. Such replacement will enable the "large" battery to have a longer life, for two reasons:

(a) when a part of the "large" battery is replaceable, such replacement provides replenishment of part of the battery with new capacity; and (b) the device's power management can be designed to use the main rechargeable battery only after the auxiliary battery is depleted or almost depleted, such that the life of the main rechargeable battery itself can be lengthened, since there is less total use thereof.

(iii) From a marketing point of view, the user perceives that the battery is smaller than the battery of a similar device without such an auxiliary battery, since the main rechargeable battery is internal and generally untouched, and the user has access to and sees only the standard-sized auxiliary battery.

In order to accomplish correct operation of the auxiliary battery, the bidirectional charger, according to various preferred embodiments of the present invention, should have a number of operational features, as follows:

(i) Real-time charge current control is required to control the current flow from the auxiliary battery to the main rechargeable battery, to ensure optimal results in typical portable devices, particularly with a primary auxiliary battery. This control is performed using a current control algorithm to be described hereinbelow.

(ii) The bidirectional charger should have associated control algorithms for automatic detection of the auxiliary battery chemistry, namely whether it is a primary battery or rechargeable.

(iii) If rechargeable battery chemistry is detected, the bidirectional charger should ensure control of the charge current from the AC adapter charger when used, to the auxiliary battery.

(iv) The activation or deactivation of the auxiliary battery may preferably be made optional and user selectable by means of the main user interface of the device, preferably through an on-screen menu. Alternatively and preferably, a mechanical switch on the device/battery may be used.

(v) The option to display on the device's main display screen, the status of the auxiliary battery, such as whether it is idle, or providing current to the main rechargeable battery or to the device, or is being charged itself.

Reference is now made to FIGS. 4A to 4C, which are illustrations of the bottom rear side of a laptop computer 30, showing methods of incorporating an auxiliary battery and bidirectional charge control system according to more preferred embodiments of the present invention. In FIG. 4A is shown a typical example of a prior art standard rechargeable battery pack 32 which plugs into its recess 34 at the back of the computer 30. In FIG. 4B, there is shown an extended hybrid battery pack 36 according to a preferred embodiment of the present invention, similar in size to the extended battery packs supplied by some laptop manufacturers, in which the auxiliary batteries 38 are installed in a separate compartment 40 at the rear of the battery pack. This separate compartment has conventional battery contacts for the auxiliary batteries, and preferably has a slide or a hinged or a removable cover 42 or other means, such that there is easy user access to the compartment for changing the auxiliary batteries 38, if and when required. The auxiliary batteries may preferably be a set of 4 or 6, readily available, AA-sized cells, either primary or rechargeable. The bi-directional charge controller circuitry is preferably built, either into the power management circuitry of the computer, or into the battery pack itself.

According to one exemplary package design, such a hybrid battery pack embodiment could include:

(i) a standard Li-ion battery pack with 28 Watt-hours (Wh) of rechargeable energy; and (ii) an auxiliary battery contributing an additional 10 Wh of rechargeable energy if NiMH cells are used, or up to 14 Wh of primary energy if $Li/FeS_2$ primary cells are used. The auxiliary battery cells may preferably be in the form of a set of 4 AA-sized cells in compartment situated in an additional bulge of 17 mm depth by 17 mm height at the rear of the battery pack.

In such an embodiment, the compartment at the rear of the computer would then be easily accessible for removing its cover to change the auxiliary batteries if and when necessary.

Reference is now made to FIG. 4C, which is a schematic illustration of a notebook computer 50 in which the hybrid battery is designed not as a plug-in replacement to the standard pack, as shown in FIG. 4B, but rather as an integral part of the computer. In such an embodiment, the Li-Ion main battery is preferably built into the computer as a non-removable component 52, whether hard wired or socketed, but unlike current practice, preferably without simple user access. The cells of the auxiliary battery 54, on the other hand, are designed to be user removable, such as by means of their installation in a cavity 56 designed into the computer for this purpose, preferably with a removable, retractable or hinged cover 58. This type of design provides improved performance of the power source if the main battery 52 is hard-wired in, but, unlike the embodiment of FIG. 4B, it does require integration of the hybrid battery design into the entire notebook computer mechanical design process.

According to further preferred embodiments of the present invention, the bidirectional charge control system is provided with power management algorithms for ensuring optimum utilization of the auxiliary and main batteries under various conditions of depletion of the main battery. Several preferred power management algorithms are provided according to various embodiments of the present invention. Though these algorithms are applicable for use with any mobile device, they are particularly relevant for use with portable computers and mobile phone applications, and will be described as such in the descriptions below.

A first algorithm, according to one preferred embodiment of the power management algorithms, ensures that while the auxiliary battery is in use, the current drawn is regulated in real time according to the immediate current needs of the device, so as to avoid inefficient high current drain from the auxiliary battery. Thus, under normal operating conditions when the main battery is not fully depleted, or when the device is not on and the main battery is being charged by the auxiliary battery, the algorithm ensures that a smart charge profile is followed to ensure most efficient use of the available power capacity of the auxiliary battery, according to the main and auxiliary battery types.

This charge control algorithm is particularly important for mobile telephone use, because of the large variations in current drawn by the device between states of transmission, and reception. During transmission time, the peak current requirement can be far in excess of what the auxiliary battery alone can supply, especially when the auxiliary battery contains primary cells. Thus, for example, while the maximum average current required to power a mobile phone is generally of the order of 400 mA, it also uses current peaks of up to 2 A during transmission. Mobile phones also typically operate at 3-4.1V. This means that to supply the peak current to the device, the primary cells of a hybrid battery used in this application must provide at least 6 W of power. Since the standard primary alkaline battery operates at around 1.2 V, this would require a 5 A current peak from the battery. Because of their high internal resistance, primary batteries cannot generally supply such a current load.

This problem is solved using the hybrid battery of the present invention by programming the charge controller such that the main rechargeable battery behaves as a charge capacitor, supplying the peak current, and the primary auxiliary battery behaves as a current source, supplying average current requirements. Meeting the peak current requirements in a situation such as that of the above described mobile telephone, in fact demands very little energy from the secondary battery, because the peaks last for very short lengths of time. Accordingly, the charge controller must respond to the average current load, not the instantaneous current.

Reference is now made to FIG. 5 which is a graph illustrating the current-voltage control characteristics of the charge controller algorithm, according to a further preferred embodiment of the present invention. The characteristic must supply enough current from the complete hybrid battery to operate the device, and on the other hand it must minimize the losses associated with extracting too high a current from the primary auxiliary battery. FIG. 5 illustrates how charging current from the auxiliary primary battery is controlled as a function of the voltage of the main secondary battery voltage. Charging current is maintained at a high level when the main secondary battery voltage is low, since a low main battery voltage is a sign of a partially depleted main battery, or of high average current usage by the device. Charging current is then decreased as the main battery becomes more charged, as indicated by the rising voltage of the main battery, until the charging current is stabilized at a constant minimum value. Thus, the charging current is kept at its lowest possible value in all situations, minimizing the losses from the primary battery's internal resistance.

Referring again to FIG. 5, load current lines are plotted for high and low load use. When the device has a high average current load, the controller is programmed at start up to overshoot the required average current to ensure that sufficient current is available both to operate the device, and to top-up any depletion of the main battery. The characteristic then decreases the supplied current to the equilibrium level, at which the charging current is equal to the load current. During the initial overshoot period, the energy supplied due to the excess current is not lost, but is stored in the secondary battery. This current is relied upon when the primary battery is nearing depletion and can no longer supply the minimum operational current. If the control characteristic were such that no overshoot of the required average current was achieved, the device would not be able to operate instantly on demand.

When the device is off or in a standby mode with a very low current load, the controller also starts at a high charging current, and then quickly reduces it to the minimum current, as shown in FIG. 5. Since the load current is very low, the primary battery can keep steadily and slowly charging the secondary battery at a low current, this being the most efficient way of drawing current from the primary auxiliary battery.

The graph of FIG. 5 thus illustrates how the charge control algorithm covers the full spectrum of usage situations, including voltage controlled charging as the secondary battery nears full capacity, this being a requirement for Li-Ion batteries.

In devices that have relatively high power loads, such as laptop computers, a further power management algorithm is designed to enable the auxiliary battery to power the device without interruption in a worst case scenario in which the main battery is almost depleted. In general, an auxiliary battery using primary cells has a limited power output, and this output may not be sufficient to power the device alone. Consequently, if the main battery is allowed to deplete completely, before switching in the auxiliary battery, the user would have to wait for the auxiliary battery to charge the main battery somewhat before being able to continue to work. This algorithm thus operates by first detecting when the main battery is nearing depletion. The closeness to depletion is determined by a preplanned criterion, but is typically at 10% or more of the total charge capacity, and is preferably determined by the terminal voltage of the main battery. When such a state is detected, the power management system takes appropriate action in order to prevent the main battery from becoming completely depleted, by initiating the drawing of power from the auxiliary battery, if this is not already happening. This action can be performed either by means of an indication to the user, preferably a screen displayed message or an audible warning message to switch in the auxiliary battery, or it can be performed automatically by the control system. Thus, the power of the auxiliary battery is utilized together with the remaining power available from the almost depleted main battery, to provide sufficient power to continue immediate operation of the device, until both batteries are completely depleted. When this happens, for continued operation of the computer, either a new set of auxiliary batteries are installed to continue work or to charge the main battery, or access has to be made available to an external power source charger.

According to one exemplary embodiment, a notebook computer which requires 14 W of power to operate, has a Li-Ion main battery of 28 Wh, and an auxiliary battery made up of 4 Li/FeS$_2$ AA-sized cells, each of which can provide a maximum output current of 2 A. This translates into a maximum output power of approximately 2.5 W per cell, i.e. 10 W for all 4 cells. At this power output, since these cells can supply approximately 10 Wh of energy, the cells can give approximately 1 hour of usage time. Since the notebook computer has a power consumption not far in excess of the power output of the auxiliary battery, provided that sufficient power is left in the main battery when this power management algorithm commands switching in the auxiliary battery power, the computer can continue to operate on the combination hybrid battery for the remainder of its charge life. In this example, the algorithm should ensure that there is at least 4 Wh (4 W output for a duration of 1 hour) left in the Li-Ion battery before the auxiliary battery cells are used. From this point on, the user should in theory still have a full 60 minutes of usage time, drawing 10 W from the auxiliary battery and 4 W from the Li-Ion battery. Of this remaining hour, the additional time effectively provided by the use of the auxiliary battery is 43 minutes.

In general, it should be noted that an auxiliary battery containing primary cells, such as the above-mentioned $Li/FeS_2$ cells, provides longer operation to the computer than one using secondary cells such as NiMH cells, because the $Li/FeS_2$ cells have a higher energy density than the NIMH cells. However, the NiMH cells have a higher current capability, and thus are able to power the computer alone when the main Li-Ion battery is completely depleted.

Since such $Li/FeS_2$ cells, if used at their maximum power drain, not only generate much heat, but also are operating at less than their optimum efficiency, their use in the worst-case scenario described above should preferably be avoided. According to another preferred method of the present invention, the power management system is programmed to provide the user with an early notification, either audibly or on-screen, that the main battery is running low, suggesting to the user to begin using the auxiliary battery even though the main battery has not yet reached the above-described "close to depletion" threshold. Such timely use of the auxiliary battery ensures optimum efficiency of the power stored therein.

All rechargeable batteries have a limited cycle life—the higher the number of charge-discharge cycles performed, the lower its useable capacity. When the auxiliary battery comprises secondary cells, such as NiMH cells, the main and auxiliary batteries work together, as one large rechargeable battery. As mentioned hereinabove, this in itself lengthens the lifetime of the expensive main battery, since the cheaper replaceable auxiliary battery cells take on part of the load. However, in addition to this overall effect, and according to a further preferred algorithms of the present invention, when the auxiliary battery comprises secondary cells, the device is programmed to manage power drain primarily from the auxiliary battery, such that the cheap replaceable auxiliary battery undergoes many of the charge/discharge cycles which would otherwise be provided by the expensive-to-replace main battery. So long as the discharge cycles are shallow, meaning that the battery is discharged only partly between charges, this generally being the case, for example, with laptop computer use, the algorithm ensures that almost all of the current drain is taken from the auxiliary battery. By this means, the usage of the expensive-to-replace main battery is substantially reduced, and its lifetime is thus substantially increased.

To illustrate this effect, reference is now made to FIG. 6, which illustrates some experimental results obtained in powering a notebook computer using a 30 Wh capacity hybrid battery according to the present invention, containing an auxiliary battery with 4 NiMH cells providing 10 Wh of energy, and a main Li-Ion battery providing 20 Wh of energy. For 50% depth of discharge cycles, an equivalent battery of 30 Wh capacity containing only Li-Ion cells would deteriorate to 75% charge retention after 200 cycles. On the other hand, when using the Hybrid Battery of the present invention, as shown in the upper curve, the Li-Ion section of the hybrid battery still has 95% retention after 200 cycles, and will tolerate many hundreds of cycles more before its retention drops to 75%. The life of the Li-Ion battery is thus shown to have increased several fold. For a 33% depth of discharge, the lifetime of the Li-Ion battery in a hybrid battery of the present invention may reach about an order of magnitude better than a conventional main battery having only Li-ion cells.

Figure 7:
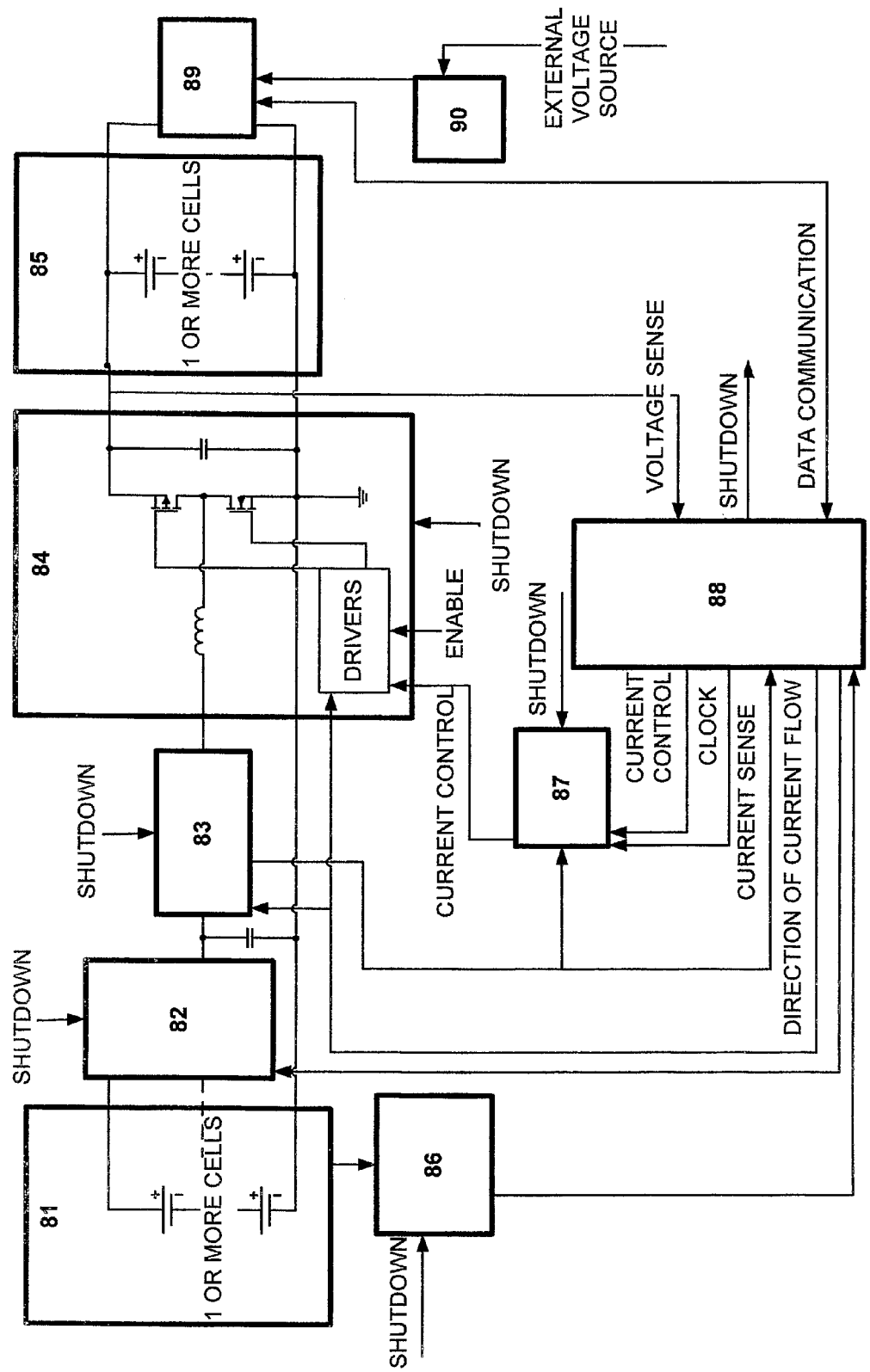
FIG. 7 is a block circuit diagram of the power control system of the bidirectional battery charge controller of the present invention, showing a preferred architecture which enables the various features described herewithin.

Reference is now made to FIG. 7, which is a block circuit diagram of the power control system of the bidirectional battery charge controller, showing the architecture which enables the above-described features of the present invention. The embodiment shown in FIG. 7 is the more common situation wherein the main battery powering the device has a higher voltage than the auxiliary battery. However, the reverse situation can also be found in some devices, wherein the main battery powering the device has a lower voltage than the auxiliary battery and in such a case, some of the circuit functions of the blocks of the embodiment of FIG. 7 need to be reversed, but the overall functional structure is similar.

Referring now to FIG. 7, the auxiliary battery 81 is preferably constructed so that the voltage of each cell can be determined separately. This can be achieved by providing each separate cell with contact taps from both of its terminals to the outside. This enables battery chemistry detection algorithms, such as that described in the co-pending patent application by the present inventors for "Charging Methods for Battery Powered Devices", to be applied separately to each cell of the auxiliary battery. The control system can then supply to the user warnings about any specific cell of the battery. The voltage taps are connected to the rest of the control circuit by means of a block of switches 82. In the example shown in FIG. 7, an auxiliary battery with 2 cells is illustrated, such that three wires need to be output to the switch block to enable the determination of the voltages of each of the two cells. The block of switches 82 is organized to output to the rest of the circuit, the voltage between one end of the auxiliary battery and of only one cell at a time. This feature is used in the cell balance algorithm, also described in the co-pending patent application by the present inventors for "Charging Methods for Battery Powered Devices".

The current to or from the auxiliary battery 81 flows into the bi-directional DC-DC Power Stage 84, which is a bi-directional voltage conversion unit, allowing current flow from the auxiliary battery 81 to the main battery 85, or vice versa, and converting the terminal voltage accordingly, depending on the direction of the current flow.

The magnitude of the current flow into or out of the auxiliary battery 81 is measured by the bi-directional current sensor 83, which senses the current flowing through the inductor in the bi-directional DC-DC converter 84. Since some designs of current sensors need to know the direction of flow, the direction in which the current is sensed is reversed in accordance with the signal received from the Control block 88.

The Main Battery 85 for powering the device 89, comprising one or more cells, usually contains rechargeable Li-Ion cells. Usually, the Main Battery 85 is physically internal to the Portable Device. As is usual in such portable devices, a wall charger 90 is provided for charging, if so desired, from an external voltage source, such as a mains power source. The Portable Device can also receive energy from the Auxiliary Battery 81.

The Control block 88 is the main control unit of the Bi-Directional Battery Charge Controller, and controls the overall operation of the entire circuit. It receives inputs corresponding to the voltage, current, and temperature of each cell, and uses the above-mentioned algorithms to control the entire system, including the desired level and direction of current flow. The desired level of current is determined by the Control block 88. Control levels output from the Control Box 88 or the direction of current flow can be used to shut down the circuit. Data communication between the portable device 89 and the Control block 88 can be achieved by use of the standard data communication lines adopted in such devices, and are used to communicate user-generated commands from the device, and to send control-generated messages back to the user.

A number of additional control elements are operative within the architecture of FIG. 7. A Voltage and Temperature Sense Block 86 is connected to the auxiliary battery 81, and senses preferably both the terminal voltage and temperature of each of the cells in the auxiliary battery 81 separately. The Current Controller 87 controls the level of current through the DC-DC converter by sending PWM pulses of the appropriate duty cycle, using a current mode control cycle, to the drivers in the Bi-Directional DC-DC Power Stage 84. The PWM pulses are output according to the desired current level setting received from the control block 88.

The current controller 87 also receives inputs of the system clock from the control block 88, and of the actual current level from the current sensor 83.

Figure 8:
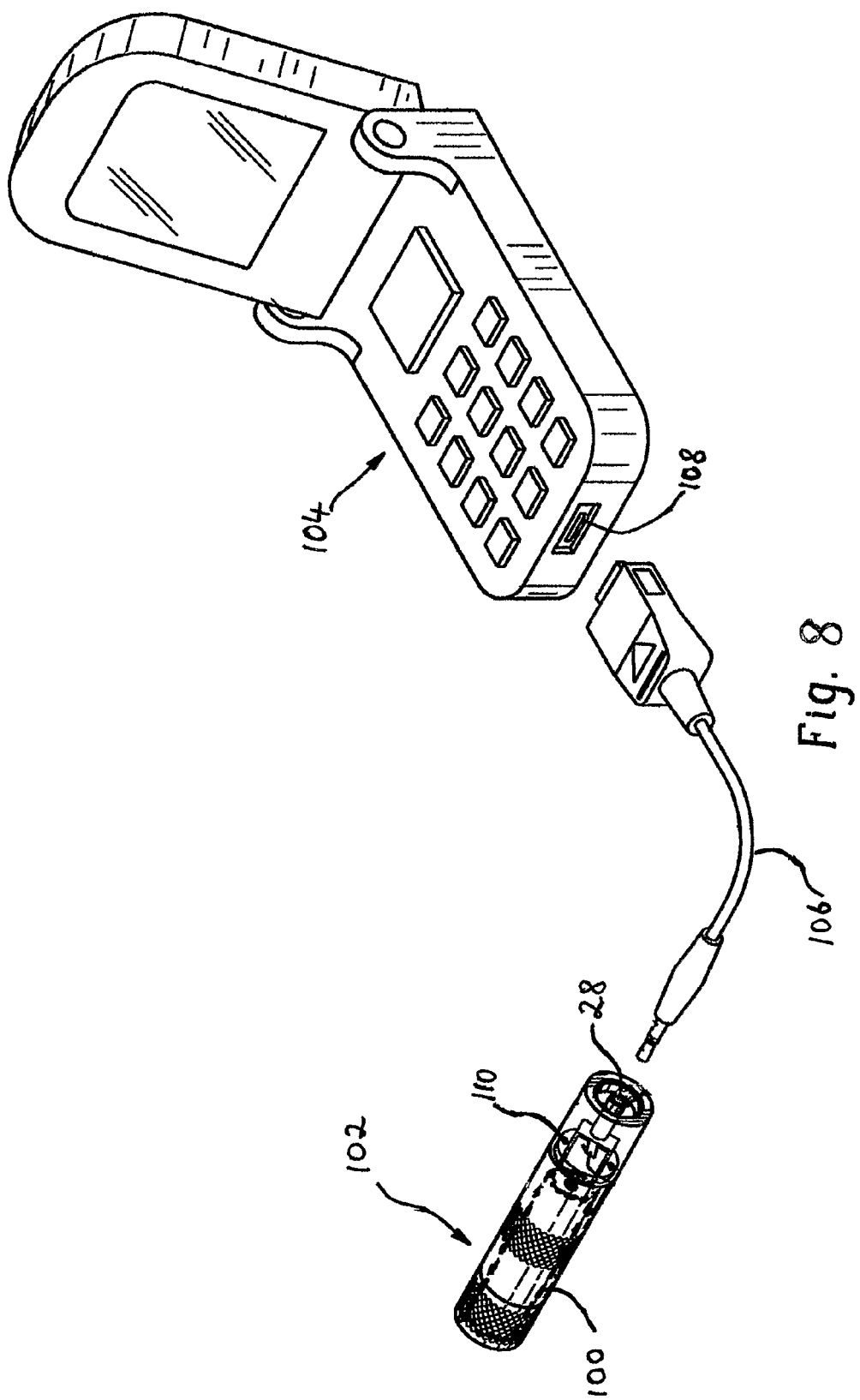
FIG. 8 illustrates schematically a further preferred embodiment of the present invention, whereby the auxiliary battery is installed and used externally to the portable device as an external bidirectional charger unit.

Reference is now made to FIG. 8 which illustrates a further preferred embodiment of the present invention, whereby the auxiliary battery 100 is installed and used externally to the portable device 104, which contains the main battery. The auxiliary battery 100 is shown packaged into a separate housing 102, connected to the portable device preferably by means of a single connector 28 and a flexible lead 106, and plugged thereby into the external charging input 108 of the portable device. In this embodiment, the bidirectional charge controller is also built into the housing containing the auxiliary battery, preferably on a printed circuit board 110. The auxiliary battery can thus be considered to behave as a compact portable external charger or power supply for the device, for use, for instance, in situations when the main battery of the device is depleted without access to a mains recharging source of power.

The bidirectional charge controller of the portable external charger preferably incorporates all of the functions of the controller circuitry shown in FIG. 7 hereinabove. However, two functions are of particular importance. Firstly, because of the exposed nature of the housing, it is important that the unit senses the battery chemistry of the battery inserted into the housing to prevent charging of a primary cell. Also, it is important that the unit efficiently converts the voltage of the current being controlled depending on whether the auxiliary battery is supplying current or is being charged. This embodiment is unlike those described previously, where the auxiliary battery is built into a known device with supposedly know main battery characteristics and requirements, in that it involves a portable power source which can be used to power any device having a compatible connector. Thus, since the manufacturer has no control over the type of device the auxiliary battery of the unit is to power, there may be need for additional functions to be incorporated into the control circuits, such as checking the status of the main battery of the device to determine that it is suitable to be charged, or providing a visual signal to the user, such as by means of a LED, that the unit contains a cell ready to supply current, and others.

Furthermore, the auxiliary battery of a portable external charger has a number of operational differences from the internal auxiliary batteries described in the previous embodiments. For instance, before the unit is connected to the portable device, it has no electrical contact with the power source of the main battery of the device. Therefore, the bidirectional charge controller has to be completely self-powered, by means of the cell inserted into the housing. The bidirectional charge controller circuit 110 is thus designed to have a very low standby current load, which can be arranged to be only several tens of microamperes, thus enabling the unit to be ready for use, after insertion of a battery, for periods of months without depleting the battery. Furthermore, even under these conditions, and when not yet connected to a load for charging, it must generate a higher voltage on its flexible lead 106, suitable for effecting a charge, so that the portable device detects the presence of a charging device the moment the lead is plugged into the external charging input 108 on the device.

Furthermore, since wall plug and similar external power supply chargers are generally designed to operate with simpler characteristics than those of the bidirectional charge controller of the present invention, the auxiliary battery unit of the present embodiment may preferably incorporate a bidirectional charge controller having a simpler charging algorithm compared with that of the previous embodiments. Usually, external wall chargers behave as a constant current source, simply pushing charge current into the external charging input of the device, and the charging circuits of the portable device itself control this inflow of charge current until the main battery is full. The charging algorithm of the bidirectional charge controller of the external auxiliary battery unit of the present embodiment may thus also be constructed to supply current to the device with similar characteristics, and thus be considerably simplified, as compared with that of the previous embodiments. Thus for instance, it will not have to perform any "stop charging" routine when the main battery approaches full charge, as the previous charge algorithms had to, since the internal charge control circuitry of the device is designed to follow the entire charge profile. On the other hand, for charging current flowing through the bidirectional charge controller from the wall plug charger to the portable external charger auxiliary battery, there is still need for a charge current algorithm which will properly control the charging profile of the auxiliary battery.

Since the bidirectional charge controller of the portable external charger enables it to be used either for charging or for being charged through the same connector, and without any user intervention to select either of these roles, it is important that the portable external charger can determine for itself whether it is connected to a device as a load, or to a wall charger for recharging of its own battery. A simple voltage test at the connector is insufficient, since a wall charger and the converted voltage to power the device may have similar levels. Therefore, according to another preferred embodiment of the present invention, the portable external charger is provided with a function checking routine, whereby the output voltage at the connector is removed at regular intervals for a short time, typically every few seconds for a duration of the order of a few tenths of a second, and typically less than 0.5 sec., and the connector voltage is measured. If a measurement shows an essentially steady voltage, then it is clear that the portable external charger is connected to a wall charger or another external source of power for charging of its own auxiliary battery. If on the other hand, the voltage falls during the measurement to a lower level, typically by 0.3 volts or more, then it is clear that the portable external charger is connected to a device for recharging the main battery of the device, and the bidirectional charge controller control functions are switched accordingly.

The auxiliary battery is preferably a secondary cell, and the use of the bidirectional charge controller circuit then also enables the cell to be charged when desired by connecting the auxiliary battery housing to the output socket of an external charger, such as a wall plug charger, or to a car dashboard socket. The portable external charger then has a double and reciprocal function it can charge the portable device by connection to the portable device's charging input connector, and it can be charged itself by connection to an external wall charger output connector. If the device's charging input connector has the opposite gender to the external wall charger output connector, as is the usual arrangement, there will be need for a male-to-female adapter, or alternatively, separate connection leads for the two operations. If a sexless connector is used for the charging function, then no such adapter will be needed.

Alternatively and preferably, a primary cell can be used as the auxiliary battery, and the unit then provides all of the advantages of the control functions of the bidirectional charge controller, such as voltage sensing, voltage conversion and charge rate control, but since the battery cannot be recharged, it has to be replaced when depleted.

The embodiment shown in FIG. 8 is particularly convenient, since it allows the use of a single AA-sized cell, which is widely available and of low cost. The voltage converter circuitry then ensures that the comparatively low voltage of the auxiliary cell is boosted to that required by the device circuitry when the unit is supplying current, and effectively down-converts the external charger voltage output so as to limit the charging current when the cell in the unit is being charged. It is to be understood though that such an external charger auxiliary battery can also preferably contain more than one cell.

Figure 2:
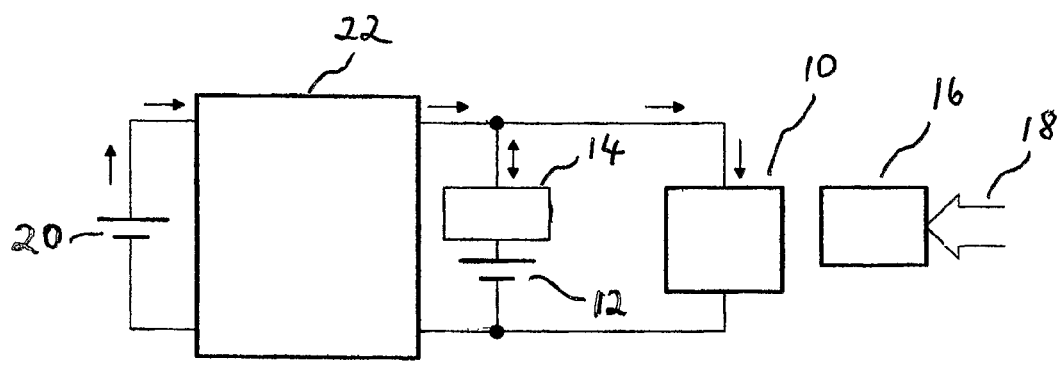
FIG. 2 shows the operation of the bidirectional battery system of FIG. 1, when supplying current from an auxiliary battery to the main rechargeable battery of the device, thereby giving an energy boost to the rechargeable battery when needed.
Figure 3:
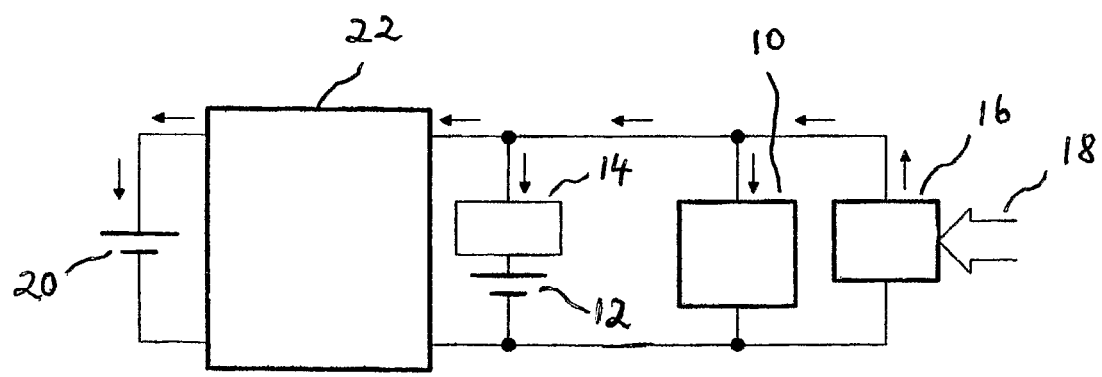
FIG. 3 shows the operation of the bidirectional battery system of FIG. 1, when supplying current from the device's AC adapter charger through the bidirectional charge controller to the rechargeable auxiliary battery.
Figure 9:
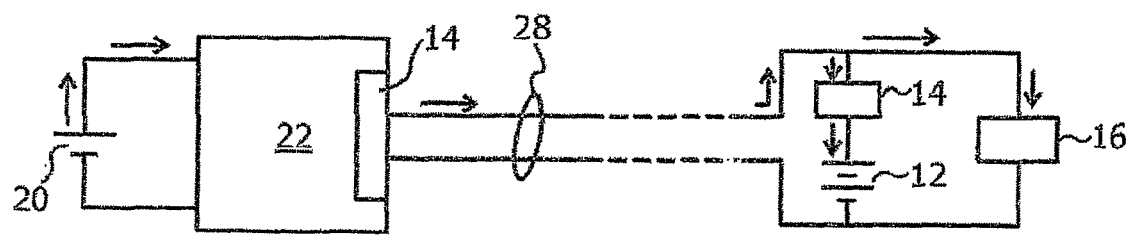
FIG. 9 is a schematic block circuit diagram, similar to those of FIGS. 1 to 3, showing the operation of the bidirectional battery system of the present invention according to the preferred embodiment of FIG. 8.
Figure 10:
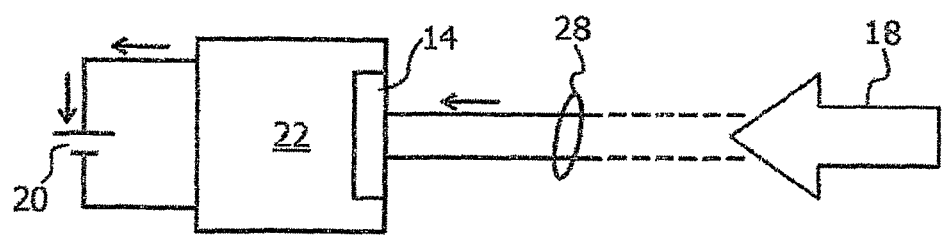
FIG. 10 shows the situation when the portable external charger is used to input current to charge the battery of the portable electronic device.

Reference is now made to FIGS. 9 and 10, which are schematic block circuit diagrams, similar to those of FIGS. 1 to 3, showing the operation of the bidirectional battery system with an external auxiliary battery in a portable external charger, as illustrated in the embodiment of FIG. 8, when the auxiliary battery 100 is being charged directly by connection to the external wall plug charger 18. This mode of charging operation generally replaces that shown in FIG. 3, since, unlike the embodiment shown in FIG. 3, when the regular wall plug charger 18 is connected to the external auxiliary battery 20 to charge it, the auxiliary battery cannot be connected to the device at the same time, as there is generally only one connector 28. FIG. 9 shows the situation when the portable external charger is used to input current to charge the battery 12 of the portable electronic device 10. Fuller details of the operation and use of the bidirectional charge controller with an external additional battery are to be found in co-pending PCT Application, to the inventors of the present application, and entitled "Portable Battery Operated Power Supply".

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A battery power supply system for powering a portable electronic device, comprising:
   a rechargeable battery;
   a cavity for receiving an additional battery, said additional battery comprising of at least one primary cell and at least one rechargeable cell; and
   a bidirectional charge controller operative to (a) control current flow between said additional battery and said rechargeable battery, (b) determine the battery chemistry of cells in said additional battery, and (c) prevent current flow into said additional battery if said additional battery comprises one or more primary cells,
   wherein said bidirectional charge controller regulates current supplied from said additional battery to charge said rechargeable battery at a rate that (i) depends on the state of charge of said rechargeable battery, and (ii) is optimized for energy transfer from said additional battery.

2. A battery power supply system according to claim 1 and wherein said bidirectional charge controller controls current flow from said additional battery to said rechargeable battery, and from at least one of said rechargeable battery and an external current source to said additional battery.

3. A battery power supply system according to claim 1 and wherein said additional battery has a first nominal terminal voltage, said rechargeable battery has a second nominal terminal voltage, and said bidirectional charge controller converts current output from said additional battery at said first nominal terminal voltage to another voltage for at least one of powering said device and charging said rechargeable battery.

4. A battery power supply system according to claim 3, and wherein said first nominal terminal voltage is lower than said second nominal terminal voltage.

5. A battery power supply system according to claim 3, and wherein said first nominal terminal voltage is higher than said second nominal terminal voltage.

6. A battery power supply system according to claim 1 and wherein said additional battery comprises at least one primary cell, and wherein said power supply system initiates the drawing of current from said additional battery only when the rechargeable battery is depleted down to a preplanned criterion.

7. A battery power supply system according to claim 6 and wherein said preplanned criterion is that said rechargeable battery is at least 90% depleted.

8. A battery power supply system according to claim 1 and wherein said at least one rechargeable cell in said additional battery is either one of a NiMH and a NiCd cell.

9. A battery power supply system according to claim 1 and wherein said at least one primary cell in said additional battery is either one of an alkaline cell and a fuel cell.

10. A battery power supply system according to claim 1 and wherein said rechargeable battery is installed socketlessly into said device.

11. A battery power supply system according to claim 8 and wherein only said additional battery is readily accessible for replacement by a user.

12. A battery power supply system according to claim 1 and wherein said additional battery comprises at least one rechargeable cell, and said bidirectional charge controller preferentially draws current from said additional battery before drawing current from said rechargeable battery.

13. A battery power supply system according to claim 12 and wherein said preferential drawing of current from said additional battery before drawing of current from said rechargeable battery is operative to lengthen the lifetime of said rechargeable battery.

14. A battery power supply system according to claim 12 and wherein said rechargeable battery is used only after the additional battery is substantially depleted, such that the life of the rechargeable battery is lengthened.

15. A battery power supply system according to claim 1 and wherein said rechargeable battery is a Li-ion battery.

16. A battery power supply system according to claim 1 and wherein said portable electronic device is any one of a cellular telephone, a video camera and a laptop computer.

17. A battery power supply system according to claim 1 and wherein said additional battery is installed within said device.

18. A battery power supply system according to claim 1 and wherein said additional battery and said bidirectional charge controller are installed in a housing external to said device.

19. A battery power supply system according to claim 18 and wherein said housing comprises a single connector which both outputs current from said additional battery to said portable device, and which inputs charge current for said additional battery from an external charger.

20. A battery power supply system according to claim 3 and wherein said bidirectional charge controller converts current output from said additional battery at said first nominal terminal voltage to another voltage for powering said device, even if said rechargeable battery is depleted beyond a predetermined criterion.

21. A battery power supply system according to claim 1 wherein said bidirectional charge controller contains a microcontroller.

22. A battery power supply system according to claim 1 wherein said bidirectional charge controller is connected to said electronic device by at least one data communication line.

23. A battery power supply system according to claim 1 further comprising contact taps contacting the terminals of each cell of said additional battery, such that the battery chemistry of each cell in said additional battery can be determined.

24. A battery power supply system according to claim 1 wherein said additional battery comprises at least one primary cell.

* * * * *